United States Patent
Bariant et al.

(10) Patent No.: US 10,688,987 B2
(45) Date of Patent: Jun. 23, 2020

(54) METHOD FOR GENERATING A SURROUNDINGS MAP, AND DRIVER ASSISTANCE SYSTEM

(71) Applicant: VALEO Schalter und Sensoren GmbH, Bietigheim-Bissingen (DE)

(72) Inventors: Jean-Francois Bariant, Bietigheim-Bissingen (DE); Markus Heimberger, Bietigheim-Bissingen (DE); Roland Geiger, Bietigheim-Bissingen (DE); Anto Michael, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 430 days.

(21) Appl. No.: 15/501,576

(22) PCT Filed: Aug. 4, 2015

(86) PCT No.: PCT/EP2015/067869
§ 371 (c)(1),
(2) Date: Feb. 3, 2017

(87) PCT Pub. No.: WO2016/020342
PCT Pub. Date: Feb. 11, 2016

(65) Prior Publication Data
US 2017/0225678 A1    Aug. 10, 2017

(30) Foreign Application Priority Data
Aug. 5, 2014    (DE) .................. 10 2014 111 127

(51) Int. Cl.
*B60W 30/00* (2006.01)
*B60W 30/06* (2006.01)
(Continued)

(52) U.S. Cl.
CPC ............ *B60W 30/06* (2013.01); *B60W 30/14* (2013.01); *G01S 15/876* (2013.01); *G01S 15/931* (2013.01);
(Continued)

(58) Field of Classification Search
None
See application file for complete search history.

(56) References Cited

U.S. PATENT DOCUMENTS

2008/0049975 A1* 2/2008 Stiegler ..................... G06T 7/20
  382/104
2010/0198513 A1* 8/2010 Zeng ..................... B60W 40/02
  701/300

(Continued)

FOREIGN PATENT DOCUMENTS

DE    100 26 586 A1    11/2000
DE    10 2012 208302 A1    11/2013
(Continued)

OTHER PUBLICATIONS

International Search Report issued in PCT/EP2015/067869 dated Oct. 12, 2015 (2 pages).
(Continued)

*Primary Examiner* — Truc M Do
(74) *Attorney, Agent, or Firm* — Osha Liang LLP

(57) ABSTRACT

The invention relates to a method for generating a surroundings map (12) of a surroundings area (8) of a motor vehicle (1), in which method the surroundings area (8) is captured by way of at least one sensor, in particular ultrasound sensor (5, 6, 14, 15), on the motor vehicle, wherein capturing of the surroundings area (8) by way of the at least one sensor (5, 6, 14, 15) is performed at at least two different points in time (T1, T2), and in a manner dependent on said surroundings clearance situations detected in each case in a manner
(Continued)

dependent on items of sensor information at the points in time (T1, T2), a decision is made as regards whether an object (11, 13) which is at least supposedly situated in the surroundings area (8) in at least one surroundings clearance situation is, upon an updating of the surroundings map (12), displayed on the then updated surroundings map (12). The invention also relates to a driver assistance system (2) and to a motor vehicle (1).

20 Claims, 4 Drawing Sheets

(51) Int. Cl.
| | | |
|---|---|---|
| *G01S 15/931* | (2020.01) | |
| *G01S 15/87* | (2006.01) | |
| *B60W 30/14* | (2006.01) | |
| *G08G 1/0967* | (2006.01) | |
| *G01S 13/931* | (2020.01) | |
| *G01S 13/89* | (2006.01) | |
| *G01S 17/89* | (2020.01) | |
| *G01S 17/931* | (2020.01) | |

(52) U.S. Cl.
CPC ........ *G08G 1/096725* (2013.01); *G01S 13/89* (2013.01); *G01S 13/931* (2013.01); *G01S 17/89* (2013.01); *G01S 17/931* (2020.01)

(56) References Cited

U.S. PATENT DOCUMENTS

| | | | | |
|---|---|---|---|---|
| 2010/0253489 A1* | 10/2010 | Cui | ............ | G01S 13/723 |
| | | | | 340/425.5 |
| 2010/0253493 A1* | 10/2010 | Szczerba | ............ | G01S 13/723 |
| | | | | 340/435 |
| 2012/0053755 A1* | 3/2012 | Takagi | ............ | B60W 40/04 |
| | | | | 701/1 |
| 2014/0025292 A1* | 1/2014 | Stahlin | ............ | G01C 21/32 |
| | | | | 701/461 |
| 2014/0309841 A1* | 10/2014 | Hara | ............ | G05D 1/024 |
| | | | | 701/26 |
| 2015/0266509 A1* | 9/2015 | Ignaczak | ............ | B62D 15/027 |
| | | | | 701/1 |

FOREIGN PATENT DOCUMENTS

| | | |
|---|---|---|
| FR | 2 562 265 A1 | 10/1985 |
| JP | H6 148328 A | 5/1994 |
| JP | 2013-36978 A | 2/2013 |
| JP | 2013-101485 A | 5/2013 |

OTHER PUBLICATIONS

Written Opinion of the International Searching Authority issued in PCT/EP2015/067869 dated Oct. 12, 2015 (5 pages).
The Notification of Reasons for Refusal issued in corresponding Japanese Patent Application No. 2017-506400, dated Feb. 26, 2018 (9 pages).

* cited by examiner

METHOD FOR GENERATING A SURROUNDINGS MAP, AND DRIVER ASSISTANCE SYSTEM

The invention relates to a method for generating a surroundings map of a surroundings area of a motor vehicle, in which method the surroundings area is captured by way of at least one sensor on the motor vehicle. The invention also relates to a driver assistance system having at least one sensor and having an evaluation unit.

Ultrasound sensors are well known in automotive engineering. By way of these specific sensor types, the surroundings of the motor vehicle are captured and, in a manner dependent thereon, it is for example the case that a suitable parking bay is identified. In more recent applications, provision is also made for the surroundings of the motor vehicle to be represented and thus displayed on a display unit on the basis of the items of information detected by the ultrasound sensors. Such surroundings maps may for example be generated as vectorial maps or grid maps. In a manner dependent on a distance of an ultrasound sensor on the motor vehicle to an object, a specific clearance is then formed.

It is however also known that, in specific situations, ultrasound sensors exhibit uncertainties with regard to detection accuracy or detection rate. Said uncertainties are based in particular also on physical limits of said ultrasound technology. For example, it is known that the detection rate of objects by way of ultrasound sensors is also dependent on the shaping of the objects. It is thus possible for relatively small objects to be detected in an improved manner in an area close to the ultrasound sensors. Thus, the larger corresponding objects are, they can generally also be captured better, that is to say "more stably" and at all, at a relatively great distance from the ultrasound sensor. Furthermore, it is for example the case that very angular objects are more difficult to capture by way of the ultrasound sensors than less angular objects.

Furthermore, the position of the ultrasound sensor relative to the object to be detected is an aspect that has an effect on the detection accuracy or the detection rate. Highly accurate detection can be achieved for example if a main axis of the ultrasound sensor and thus an emitted ultrasound beam is oriented as perpendicular as possible to the object to be detected. Thus, the detection accuracy becomes poorer the more acute an angle between an incident ultrasound signal and the object to be detected is. An ultrasound sensor measures radially, and is thus imprecise with regard to angular accuracy.

Furthermore, with ultrasound signals, it is not possible to, as it were, see through an object, such as the case for example with x-rays. As a result of this, a situation may arise in which, although it may be the case that no tall object is present between an ultrasound sensor and a detected object, it is however possible in this regard for very short objects to be arranged between the ultrasound sensor and the detected object, which very short objects however then cannot be captured.

Furthermore, with ultrasound sensors, it is not possible to accurately measure a relative speed of an object which is moving substantially perpendicular to the abovementioned sensor main axis. This may arise for example in the case of objects which are moving past the side of a motor vehicle, though may also arise if objects cross the direction of travel of the motor vehicle.

Owing to these technical limitations of ultrasound sensors, the problem arises, in the case of conventional embodiments, that objects are displayed incorrectly on generated surroundings maps, and/or, with regard to the further movement of the motor vehicle that has already taken place in relation to a presently displayed surroundings map, objects are shown in a different location, or are no longer up-to-date. In the case of the conventional dynamic display of objects in a digital surroundings map, there are therefore corresponding uncertainties in this regard.

At least some of the abovementioned uncertainties also arise in the case of other detection units, such as for example in the case of a camera etc.

It is an object of the present invention to provide a method and a driver assistance system in the case of which, or with which, the display of objects in a surroundings map is realized with greater accuracy.

Said object is achieved by way of a method and a driver assistance system and a motor vehicle as per the independent claims.

In the case of a method according to the invention for generating a surroundings map of a surroundings area of a motor vehicle, said surroundings area is captured by way of at least one sensor on the motor vehicle. The sensor may in particular be an ultrasound sensor, or it is possible for one or more ultrasound sensors to be used. A major concept of the invention can be seen in the fact that capturing of the surroundings area by way of the at least one sensor is performed at at least two different points in time, and in a manner dependent on said surroundings clearance situations detected in each case in a manner dependent on items of sensor information at the points in time, a decision is made as regards whether an object which is at least supposedly situated in the surroundings area in at least one surroundings clearance situation is, upon an updating of the surroundings map, included or encompassed on the then updated surroundings map, in particular is also displayed on the surroundings map then in particular also displayed on the display unit. By way of such an embodiment, it is possible for the abovementioned disadvantages with the use of sensors, in particular ultrasound sensors, for surroundings capture of a motor vehicle to be allowed for. The occurrence of incorrect detection of objects or the incorrect positioning thereof, which can then also be incorrectly displayed on the dynamically changing and digital surroundings map, can thus be considerably reduced. Furthermore, it is also possible for the display of incorrect or no longer current positions of detected objects on the surroundings map to likewise be at least considerably reduced. A dynamic update of the surroundings map can thus be significantly improved with regard to the number of objects and the object position, and in this context, it is possible for a real-time surroundings map, which in this regard is, as it were, highly precise, to be created on the basis of items of sensor information, in particular items of ultrasound sensor information.

It is preferably provided that a probability of existence, or reliability, of an object in the surroundings area during an object capture process of the sensor is characterized with one of several different confidence values. This is a particularly advantageous embodiment because, in this way, it is in effect also possible by way of the method itself for the detected items of information from the sensor, in particular ultrasound sensor, to be evaluated, and thus for the updating of the surroundings map to be made even more precise. Specifically by way of a multiplicity of different confidence values, allowance is made for the wide variety of different conditions during an object capture process, and thus it is also the case that a probability-of-existence classification is performed very much in accordance with demand and also in particular in a very fine-tuned or detailed manner. By way of such an, as it were, probability weighting of the probability of existence of an object capture process, the decision as regards whether an object which is at least supposedly in the surroundings area at least in one surroundings clearance situation is then, upon an updating of the surroundings map, displayed on the then updated surroundings map, is made more precise. Thus, it is also possible to achieve improved precision for the decision as regards whether an object is displayed on the updated surroundings map at all, and if so, it is then also possible for said object to be displayed on the updated surroundings map with greater precision with regard to the exact position of the object relative to the motor vehicle. For example, it is possible for the incorrectly positioned object in the map to be deleted, and/or to be plotted in the surroundings map with greater precision.

It is preferably possible for more than two such confidence values, in particular four different confidence values, to be defined and predefined.

In particular, it is possible here for an active confidence value to be predefined as a confidence value. Said active confidence value characterizes a highest probability of existence of an object capture process with regard to the presence of the object and/or the position of the object.

For example, said active confidence value characterizes the situation in which, as it were, it can be evaluated with greatest certainty that a captured object, even after the temporal capture of the second surroundings clearance situation, is still situated in the capture area of the sensor, in particular ultrasound sensor, and should thus be displayed on the updated surroundings map.

An exemplary second confidence value can for example be a follow-up confidence value. This then defines in particular the probability of existence, and thus the presence and/or the spatial position of the object, of an object capture process in that an object has been actively measured or captured in particular in the surroundings region in the temporally preceding first surroundings clearance situation and has then no longer been actively captured in the temporally following second surroundings clearance situation, but it can be inferred that the object is no longer situated within the capture area of the sensor.

This follow-up confidence value then indicates a probability that the object is still situated in the capture area, which probability is lower than the probability in this regard in the case of an active confidence value. Nevertheless, here, the probability of the presence of the object should still be evaluated as being so high that the object is at least displayed in the updated surroundings map. The probability of existence of the position of the displayed object is however reduced in this context in relation to the active confidence value. In the case of a follow-up confidence value, however, the situation should be regarded as being such that, for example owing to the demanded safety, it is nevertheless helpful and expedient for the object to continue to be displayed on the updated surroundings map.

It is preferable for a third confidence value to be predefined as a deletion confidence value. With said deletion confidence value, the probability that an object is present in the capture area of the sensor, in particular ultrasound sensor, is graded as being lower than with the follow-up confidence value. In the case of said third deletion confidence value, consideration is given in particular to situations in which the sensor, owing to its arrangement and/or owing to the form of the object, can no longer detect said object in a surroundings clearance situation even though said object is still situated in the capture area of said sensor. This may be the case for example with very short objects, which are then situated in a clearance between the sensor and a relatively tall object detected by the sensor. For example, this may also be the case with static and thus positionally fixed objects in specific situations, for example if the main axis of the sensor is oriented at an angle relative to the object which differs considerably from 90°, and thus the object is not captured. If, with this confidence value, the state in which the static object has been correctly detected were always valid without exception, it would in turn be possible here to implement grouping on the basis of the abovementioned confidence value, in particular also of the active confidence value. Since such an object may however also be detected dynamically or incorrectly, said third deletion confidence value is highly advantageous for the decision check. With said third deletion confidence value, a situation is thus evaluated which assesses a probability of existence of an object during an object capture process such that the probability of the absence of the object in the capture area of the sensor is duly lower than in the case of the follow-up confidence value, but owing to the situation, there is also a probability that the object is still situated in the capture area but cannot be detected. In particular, it is then the case that, with said assessment, the object is still displayed on the updated map, wherein it is also the case here that then, similarly to the case with the follow-up confidence value, the spatial position of said object may exhibit an inaccuracy or a deviation relative to the actual position in the surroundings area.

An advantageous fourth confidence value is predefined by a deleted confidence value. By way of said deleted confidence value, it is possible to assume with higher probability than with the deletion confidence value, that the object is no longer situated in the capture area of the sensor, in particular ultrasound sensor. The accuracy of an object capture process is thus, by way of said fourth confidence value, evaluated such that, with the highest degree of probability and thus at least with probability bordering on certainty, said object is no longer in the capture area of the sensor. The object which is at least supposedly detected is then, in this case, no longer displayed on the updated map on the basis of the confidence value evaluation.

It is also pointed out that the method according to the invention may be used for a wide variety of applications. For example, it may be used with different surroundings capture systems, in particular parking assistance systems, which are designed for performing an at least semiautonomous parking process. It is also possible for the approach of the method according to the invention to additionally or alternatively be used in a braking assistance system, such as for example an ACC (Adaptive Cruise Control) system. In particular, it is provided that, in these different usage situations and thus also different traffic situations, the driver assistance system reacts differently and, in this context, it is also the case that different reactions are necessary with regard to the objects and the probability of existence thereof during an object capture process.

It is preferably the case that an assignment of a specific confidence value to an object capture process is performed in a manner dependent on at least one captured surroundings clearance situation and/or on at least one predefined reference clearance and/or on a comparison of at least one surroundings clearance situation with a reference clearance and/or on the nature of an object. A nature of an object may for example be defined as the shape of the object and thus also the dimensions of the object or the type of object. In addition or alternatively, it is also possible for an evaluation regarding a movement of the object relative to the sensor and thus also relative to the motor vehicle to be taken into consideration, wherein here, it is thus then also the case that static or dynamic objects are encompassed. By way of this advantageous embodiment, it is thus in effect checked, in particular by way of a classification or a comparison, how the actual surroundings clearance situation can be depicted and how it can be evaluated and, as it were, grouped in the light of the confidence value criteria. This is also highly advantageous in that the precision with which statements can be made as regards whether an object can be displayed on an updated surroundings map is thus increased, and it is thus also possible to more precisely make statements as regards whether the object should be displayed in updated form on the surroundings map at all, and if so, how accurately in terms of position it can then be displayed in the updated surroundings map relative to the motor vehicle and/or relative to another object that is possibly to be displayed.

By way of these confidence value classifications for the display decision check, it is also possible for the items of information to be significantly improved for a vehicle user and furthermore also for the reaction of a driver assistance system which operates on the basis of these items of information of the method according to the invention to be improved. Whether and possibly how a driver assistance system then reacts can thus be configured in a highly individual and adapted manner.

By virtue of the abovementioned assignment of a specific confidence value being performed not only on the basis of one of these specific criteria but on the basis of preferably multiple such criteria, the abovementioned advantages can be further improved.

A clearance or a clearance situation generally constitutes an at least partial area of the capture area of at least one sensor, which partial area is, in particular at a specific point in time, evaluated as being free from objects. This applies to the actual traffic situation which is characterized by a surroundings clearance situation and for a reference clearance which is characterized by a predefined traffic situation.

In an advantageous embodiment, it is provided that a multiplicity of different reference clearances is predefined, which are thus initially then generally defined and in particular stored in a driver assistance system. In particular, at least in a manner dependent on a comparison of the surroundings clearance situation with at least one reference clearance and/or on a confidence value which characterizes an accuracy of said object capture process of the sensor, as mentioned above in advantageous embodiments, the object is rendered present or absent, in particular is then also displayed or is not displayed, in the updated surroundings map. This is an embodiment which is to be given particular emphasis because, by way of such predefinition and classification or categorization of specific modelled clearance situations, which are depicted by the reference clearances, the statements regarding the actual situation, which is represented by the surroundings clearance situations, can be estimated and evaluated in a further improved manner. By virtue of the fact that, by way of said multiplicity of reference clearances, allowance is made for specific situations and possibly also situations which are prioritized with regard to a frequency of probability in the actual traffic environment, it is also the case here that the accuracy of statements can be improved by way of the comparison of at least one reference clearance with the surroundings clearance situations, the decision making by way of the display of an object on an updated surroundings map. Said reference clearances are therefore very particularly essential specifications for the decision making and significantly increase the precision regarding the decision as to whether an object should be displayed on the updated surroundings map, and if so, whether in this context it is then also the case, in particular also taking into consideration the confidence values, that a particularly exact and updated position of the object on the surroundings map can be displayed. The real-time nature of an updated surroundings map on the basis of sensors, in particular ultrasound sensors, can thereby be significantly improved.

Owing to the extremely high complexity and wide variety of occurring surroundings situations that can be encountered in a surroundings area of a motor vehicle in reality, it is possible by way of this modelling with reference clearances to predefine a structuring, which is to be greatly emphasized, of said wide variety, and to permit a particularly analytical and detailed selection and grouping of the actually captured situation. By way of this refinement, it is thus also possible in highly targeted fashion, and thus also very quickly, to make highly reliable statements regarding the number of surroundings clearance situations to be evaluated, and the items of information thus obtained.

In this context, it is also made possible for the surroundings clearance situations to be compared with at least two reference clearances, which further promotes the abovementioned advantages. In particular, it can thus be provided that the selection as to whether the surroundings clearance situations are compared with only one reference clearance or with at least two reference clearances is made on the basis of items of information regarding at least the first surroundings clearance situation and/or at least the second surroundings clearance situation. It may also be provided in this context that the number of reference clearance models, and/or the specific reference clearance models, used for the comparison are selected on the basis of the sequence of the surroundings clearance situations and the items of information obtained therefrom, which can thus in particular be specified in a time sequence.

It may however also be provided that, in the case of a blanket specification, a certain priority sequence of the reference clearances is predefined, which reference clearances are then selected in said sequence for comparison with the surroundings clearance situations. It may likewise be provided that, for example in a manner dependent on which reference clearance model has been selected for comparison with the surroundings clearance situations, a second reference clearance model is selected. In this context, it may for example be the case that, on the basis of the reference clearance with which a first comparison with the surroundings clearance situations is performed, an already highly specific and targeted further comparison with a then further specific reference clearance model is possible, by way of which, building on the comparison with the first reference clearance model, a certain dependency also exists such that the precision of statements regarding the display of an object on an updated surroundings map is made possible more quickly, in a more targeted manner and more precisely.

If, in an advantageous manner, a link or a relationship of a confidence value of the confidence value model to a reference clearance model with regard to the decision regarding a display of an object on the updated map is predefined, then by way of this consideration of at least one reference clearance and of a confidence value, the decision as regards whether an object should be displayed on an updated map can be made in an even more detailed and accurate manner.

It may also be provided that, in a manner dependent on the number of objects detected in the surroundings clearance situations and/or in a manner dependent on the nature of objects detected in the surroundings clearance situations and/or in a manner dependent on the spatial position of an object detected in at least one surroundings clearance situation relative to the motor vehicle and/or in a manner dependent on a spatial change in position of an object detected in the surroundings clearance situations relative to the motor vehicle, a specific reference clearance is selected from the multiplicity of reference clearances for the comparison. By way of this advantageous embodiment, too, it is possible for statements regarding whether an object should be displayed on an updated surroundings map to be made more quickly. Since it is also the case here that a wide variety of complex relationships may arise from the abovementioned very wide variety of everyday situations in traffic, it is possible by way of this feature specification for the decision making regarding the implementation of the updated surroundings map to be differentiated and improved.

In a further advantageous embodiment, in a manner dependent on the number of objects detected in the surroundings clearance situations and/or in a manner dependent on the nature of objects detected in the surroundings clearance situations and/or in a manner dependent on the spatial position of an object detected in at least one surroundings clearance situation relative to the motor vehicle and/or in a manner dependent on a spatial change in position of an object detected in the surroundings clearance situations relative to the motor vehicle, the number of reference clearances to be taken into consideration for the comparison is determined. In this way, too, it is then possible for the advantages already mentioned above to be attained or improved.

It is preferably the case that a first reference clearance is defined as an object clearance in the case of which, for the evaluation of an object, a spacing of the object to the sensor, in particular ultrasound sensor, and the orientation of the object relative to the sensor are taken into consideration. These two parameters relate to the distance and the orientation and allow highly accurate statements to be made regarding the actual presence of an object in a capture area of the sensor. If it is thus possible for said parameter values to be detected in at least one surroundings clearance situation, then it is also possible in a highly exact manner, in particular taking into consideration a specific confidence value, in particular taking into consideration the active confidence value, to state with the highest degree of probability that the captured object is actually present in the respective surroundings clearance situation and is actually also present at the corresponding position. If this then applies to both surroundings clearance situations, then it is in effect the case that, with greatest certainty, the situation exists in which the object is actually still present and is present at the corresponding position, such that it is then also displayed exactly in the updated surroundings map.

By contrast, if a situation arises in which the distance and the orientation of an object can be accurately determined only in one surroundings clearance situation, then it is possible, in a manner dependent on whether this has taken place in the first surroundings clearance situation or in the second surroundings clearance situation, to draw conclusions regarding the probability of the presence, in turn with a then specific confidence value. By way of this very specific clearance model which is based on characteristic parameters of an object, said corresponding statements can be made.

In a preferred embodiment, for the comparison of the surroundings clearance situations with the first reference clearance in the first surroundings clearance situation, a captured distance value in the presence of a specific orientation of the object at which the object was first detected is stored as a reference distance value. At least in the event of a change in relative position between the sensor and the object occurring in the second surroundings clearance situation, it is checked whether the object has been captured in the second surroundings clearance situation. In the event of the object no longer being captured by the sensor in said second surroundings clearance situation, it is in particular the case that the object is no longer displayed on the updated surroundings map on the basis of the criteria of the first reference clearance, in particular also of a specific, in particular assigned confidence value. Then, in this specific embodiment, it is assumed with corresponding probability that, owing to a relative change in position between the motor vehicle and thus also the sensor and the object, in a time following the first surroundings clearance situation, the object is indeed no longer situated in the capture area of the sensor, and thus the relevance for display on the updated surroundings map is at least so low that display appears to be no longer necessary.

In a further advantageous embodiment, a second reference clearance is defined as a sensor clearance in the case of which, for the evaluation of an object, it is taken into consideration whether, in a surroundings clearance situation, said object is duly in the first capture area of the sensor but cannot be captured by the sensor as an object. In the case of said sensor clearance, it is preferably the case, by contrast to the object clearance, that consideration is given to the view from the sensor. In particular if, in the case of said sensor clearance model, too, the conditions of the object clearance are not satisfied and, for example, it is also the case for a short object that the distance changes, in a manner dependent on the direction of movement between the motor vehicle and the detected object in said direction of movement, such that a change from a reference distance value at which the object was first detected occurs and thus the object can then no longer be detected even though it is situated in the capture area of the sensor, said sensor clearance is of particular significance for the characterization of the surroundings clearance situation. In this context, there may be two possible underlying situations. For example, here, it may be provided that the object has been correctly detected as a static object. In this case, the object should by all means still be evaluated as being present. It can however not be captured because, owing to the object characteristics and the relative change in position in said second surroundings clearance situation, said object can no longer be captured by the sensor. For example, owing to the geometry or the dimensions, it may be the case that, when the vehicle moves away from the object and a distance greater than the reference distance value already exists, the detection may no longer be possible. This may be the case for example with very thin or small objects, which can then, with increasing distance beyond the reference distance value, no longer be captured by the sensor.

A second situation can be characterized in that an object is a dynamic object which itself thus moves relative to the motor vehicle, or an incorrectly detected object. In these two sub-cases, it can then be assumed that the object is no longer present in the capture area of the sensor. In particular, taking into consideration this specific situation and a then in particular specifically assigned confidence value, the situation can be evaluated as being one in which, with the highest degree of probability, the object is no longer in the capture area of the sensor, in particular ultrasound sensor, and should thus no longer be displayed on the updated surroundings map.

Since it is however in particular not possible, in particular is not possible with the desired precision of statements, to distinguish between a dynamic object and a static object on the basis of the items of information from the sensor, it is provided in a preferred embodiment for such a situation to be evaluated as being one in which, although the object can be assumed with high probability to no longer be in the capture area, it is nevertheless probable that said object could still be in the capture area, such that it is evaluated that, in this regard, in particular with regard to the safety requirements, the object should be displayed in the updated surroundings map. In these refinements, it is however then the case, in accordance with the already abovementioned advantageous definitions of various confidence values, that the exact position of the object in the surroundings map, in particular relative to the motor vehicle, is provided with a certain inaccuracy.

If a measurement from the sensor is available, it is preferable for the sensor clearance to be limited to the measurement distance, because no evaluations can be performed regarding the object lying outside said maximum measurement distance, in particular owing to the fact that, with a sensor, it is not possible to see through objects, and it is thus not possible to evaluate what is situated behind said detected, in particular tall, objects.

It is preferably the case that, during the comparison of the surroundings clearance situations with the second reference clearance, an object is displayed on the updated map, in particular also on the basis of a specific confidence value, if an object has been captured by the sensor in the surroundings clearance situation but, in the second surroundings clearance situation, the object has no longer been captured by the sensor but it can be assumed at least with a probability greater than a threshold value that the object remains in the capture area of the sensor.

In a further advantageous embodiment, a third reference clearance is defined as an active clearance in the case of which the space between the sensor and an object detected by the sensor is regarded as being free from objects of a height similar to at least captured objects, in particular free from objects greater than a height threshold value. This, too, is a particularly advantageous definition of a reference clearance, in the case of which a specific partial area of a capture area of a sensor is considered. Since there may specifically be numerous situations in which, between a captured object and a sensor, objects which are short in relation to the captured object are also present in the capture area of the sensor, which short objects can then no longer be explicitly detected by the sensor but are in particular present in the capture area, this refinement significantly increases the precision of statements that can be made regarding the updated surroundings map with regard to a depiction of objects. It may thus also be provided by way of the method according to the invention, or an advantageous refinement thereof, that, in a specific partial area of the capture area, which is then defined by the active clearance, more accurate statements can be made regarding objects supposedly situated therein, and in particular in this regard, singularly or in an advantageous embodiment in a manner dependent on other reference clearances and the surroundings clearance situations, statements can be made regarding a supposed object in said active clearance.

In an advantageous embodiment, during the comparison of the surroundings clearance situations with the third reference clearance, specifically the active clearance, an object which is supposedly captured between the sensor and the captured object in at least one surroundings clearance situation and which is in particular of a height similar to the captured object is not displayed on the updated map, in particular on the basis of a specific confidence value. It is then possible to assume with corresponding, in particular predefined, probability that no further object, in particular no further object which must be taken into consideration and is of significance, is present in said active clearance. Thus, in a preferred embodiment, the active clearance also encompasses a situation in which the sensor performs detection with greatest probability of existence, in particular with probability of existence regarding the active confidence value, and a position of the measurement can be declared with corresponding reliability and probability. Thus, with a further correspondingly high probability, it can also be assumed that no further object which is taller than a height threshold value is present any more in the active clearance between the sensor and the actively detected object, which on the side averted from the sensor thus in effect delimits the active clearance, if said actively detected object is in particular taller than the height threshold value. It may preferably be provided that objects which are shorter than the height threshold value are also in turn, on the basis of an in particular then specific confidence value, graded as being worthy of indication in the present surroundings map, and are correspondingly then also displayed on the present surroundings map. Depending on whether said interposed objects can then be captured with corresponding probability of existence, in particular in a manner dependent on the distance and the orientation, it is also possible, taking into consideration the object clearance and/or in particular the active confidence value, for the spatial position of said objects to then be determined very accurately, and for not only the display itself but also the position to be depicted in a highly precise manner in the updated surroundings map.

In a further advantageous embodiment, a fourth reference clearance is defined as a background clearance in the case of which objects are considered which are in a space of the capture area of the sensor extending, on the side averted from the sensor, so as to adjoin the active clearance and/or sensor clearance. In this way, too, a further partial area of the capture area is thus locally specified and is individually exactly evaluated and graded with regard to detection of objects.

It is preferably the case that, during the comparison of the surroundings clearance situations with the fourth reference clearance, in a manner dependent on an in turn specific confidence value of an object captured in the background clearance at least in one surroundings clearance situation, it is decided whether the object is displayed on the updated surroundings map. In particular, it is thus necessary in the case of said clearance for firstly an active clearance and/or a sensor clearance to be able to be taken as a basis and for surroundings clearance situations to be able to be correspondingly characterized by way of comparison, in order to then also be able to analyse said background clearance. Only then is it possible, in effect, in this embodiment, for the position and the dimension of the background clearance to be determined.

It is then in particular also possible for an evaluation to be performed such that the state of an object in said background clearance is graded as being unknown. Therefore, it is also possible here for different sub-groupings to be specified for objects which are present in the background clearance. In this context, it is possible for objects which can be followed with regard to the confidence value and which are thus supposedly captured in particular in both surroundings clearance situations, to be evaluated such that their confidence is evaluated as remaining the same and should not be changed during the further measurement cycles and thus during further object capture processes, which then lead to surroundings clearance situations. In the case of objects whose confidence value can be regarded as an active confidence value or as a deletion confidence value, it is in particular also the case that the confidence should remain unchanged.

Preferably, in the case of a comparison process or a comparison scenario, it is provided that, in the case of the comparison in which at least two different reference clearances are taken into consideration and, on the basis of a comparison with a reference clearance, the object is to be displayed on the updated surroundings map and, on the basis of a comparison with a different reference clearance, the object is not to be displayed on the updated surroundings map, a further decision check is performed. In this way, too, it is then possible for the accuracy of statements made, and the display accuracy, to be improved.

The decision check is preferably performed such that a display on the updated surroundings map is implemented if, at least in the case of a comparison with a reference clearance, a display is to be implemented. Thus, it is assumed in a relatively simplified and blanket manner that, if the object has at least once been graded as being one which should be displayed, this should also be implemented in particular for safety reasons. In this context, it may then be provided that, if at least one third surroundings clearance situation is taken into consideration, and thus in the case of an odd number of surroundings clearance situations being taken into consideration, a decision must be made for the display to be implemented for example on the basis of the then higher number which indicates whether or not the object should be displayed. This means that for example if, in the case of two comparisons, the result is that a display should be implemented on the updated surroundings map, and in the case of one comparison such a display is graded as being not necessary, the display is nevertheless implemented.

It may also be provided that the decision check is performed such that a weighting of the reference clearances is predefined and, in a manner dependent on the weighting, it is then decided whether a display on the updated surroundings map is implemented, if in the case of an even number of comparisons in each case a number yields that it is necessary for the object to be displayed and a corresponding equal number yields that said display is not necessary. As a result of the weighting of the reference clearances, it is also possible for the importance thereof to be evaluated differently, which also in turn, on the basis of actual traffic situations, promotes more precise decision making regarding the actual display of objects on an updated surroundings map.

It may also be provided that, on the basis of the changes to the surroundings clearance situations obtained as a result of the temporal sequence of the two surroundings clearance situations, it is decided whether or not a display on the updated surroundings map should be implemented. By way of this alternative, too, in the case of an even distribution of the results as regards whether or not, in the case of the comparison between the reference clearances and the surroundings clearance situation, an object is graded as being one which should be displayed, it is possible for the decision to be steered in one direction on the basis of this additional criteria. On the basis of said temporal sequence of the obtained items of information, it is likewise possible, in an assisting manner, for certain conclusions to be drawn as regards whether the traffic situation with the objects will most probably have a direction in which the object will become less relevant for the display or will become more relevant.

In a further advantageous embodiment, it is provided that the multiplicity of reference clearances is predefined mutually dependently with regard to the decision making regarding a display of an object on an updated surroundings map. Such a dependency may be implemented for example by way of at least one surroundings clearance situation and/or at least the nature of an object in a surroundings clearance situation and/or in a manner dependent on a position of at least one object relative to the sensor, in particular ultrasound sensor. The reference clearances are thus, in the case of such an advantageous embodiment, also linked to one another in a defined manner with regard to the decision making. This may additionally or alternatively also be realized with the confidence values, wherein it is in particular also then possible here to predefine that a linking of the reference clearances is performed in a manner dependent on at least one confidence value or multiple confidence values.

In a preferred embodiment, it is also the case with an in particular certain probability definition, and thus with statement of a confidence value, that a classification of an object as a static or dynamic object is predefined. Even though such a classification as static or positionally fixed is basically in particular not accurately possible by way of sensors, in particular ultrasound sensors, it is possible by way of such modelling to infer, with a certain probability, that a static or a dynamic model is involved.

Said model may for example define that a static or dynamic object can be inferred on the basis of items of information from the motor vehicle, in particular parameters such as the speed of the motor vehicle. For example, if it is known that the vehicle is not moving and, in the surroundings clearance situations, a change in position of an object relative to the motor vehicle can be explicitly and actively identified, for example taking into consideration and evaluating the active confidence value, it is thus possible to infer the presence of a dynamic object. This may likewise be performed if the motor vehicle is at a standstill in both surroundings clearance situations and thus has not changed its spatial position, but the object is present in one surroundings clearance situation and is not present in the other. Here, if it is in turn possible, on the basis of the active confidence value, to conclude that the object has with the highest degree of probability, and thus uniquely, been identified and captured in both surroundings clearance situations, it is also possible here to infer the presence of a dynamic object. If, by contrast, the object cannot be uniquely captured in a surroundings clearance situation, in particular on the basis of the distance and the orientation relative to the motor vehicle which is at a standstill in both surroundings clearance situations, then here, it is in turn necessary to assume, with a relatively great uncertainty and thus with low probability, that a dynamic object is involved. This is because, then, in the surroundings clearance situation in which it was not possible to capture the object, in turn a situation which can be assigned to the active clearance or the sensor clearance, it is not possible to accurately decide whether the object has moved or whether it was not possible to perform the detection owing to an incorrect measurement by the sensor. In these situations, it is not possible to decide whether the object is static or whether it has thus dynamically moved and, on the basis of the change in position relative to the motor vehicle which is at a standstill, in particular on the basis of the distance and/or the orientation, a capture of the object, which may then also still be situated in the capture area of the sensor, is prevented.

By way of example, such incorrect measurements may also arise in that, on the basis of very small changes in the sensor measurement, for example on the basis of measurement tolerances, it cannot be exactly assumed that exactly the same reflection point on the object that is detected is involved in the case of two measurements and thus the generation of two surroundings clearance situations, such that in this case, too, measurement errors may arise owing to measurement tolerances. It is also possible for an object to, as it were, merge with, and at least regionally overlap, another, different object during the course of the movement over time and in the different surroundings clearance situations that then arise, such that in this case, too, uncertainties can arise in terms of probability of statements regarding a static or dynamic model. Also, in the case of a dynamic object which is moving with a non-zero speed component parallel to a sensor axis, the situation may arise in which the relative speed of the object can be determined and the object can then be classified as being dynamic.

Taking into consideration this advantageous embodiment in which it is at least also possible in turn for specific probability values and thus also confidence values on a static or dynamic model to be inferred with greater or lesser accuracy, in cases in which dynamics of the object can be assumed to have individual confidence value assignment, it is possible to provide that the object is no longer displayed on the updated surroundings map if said object has no longer been detected in the second surroundings clearance situation.

In an advantageous embodiment, it may be provided that the surroundings map as a vectorial map or else as a cell map, in which individual, in particular partial areas, of the overall surroundings area to be displayed are generated or is built up in individual cells which are lined up together, in particular are lined up together in matrix-like form.

The invention is particularly preferable for ultrasound sensors, such that the at least one detection unit or the sensor on the motor vehicle is an ultrasound sensor. The uncertainties mentioned in the introduction of ultrasound sensors can be substantially compensated by way of the invention.

Alternatively, the sensor may also be a radar sensor, a camera, a lidar sensor or a laser scanner. The surroundings area can accordingly also be captured by way of at least one radar sensor on the motor vehicle, at least one camera on the motor vehicle and/or at least one laser scanner on the motor vehicle. In particular, a combination of ultrasound sensor, radar sensor, camera and/or laser scanner can be used. The sensor may be any suitable surroundings capture sensor on the motor vehicle, or it is possible for a combination of multiple surroundings capture sensors to be used.

With the method according to the invention or an advantageous embodiment thereof, by way of individual clearance definitions and/or confidence value definitions, a type of classification of actually arising traffic situations with regard to object detection by means of a sensor is allowed for. This extremely high complexity of the actually possible occurring traffic situations is structurally captured by way of a decision check, based on said confidence values and/or reference clearances, by way of a display of an object on an updated surroundings map. This highly complex topic is, by way of the invention, thus allowed for in a highly targeted manner and with regard to precise decision making regarding an exact object display on the updated surroundings map, wherein here, a high speed of the decision check is additionally also taken into consideration. The numerous uncertainties of sensor measurements mentioned in the introduction are, in this case, captured in terms of their number and complexity and taken into consideration such that the best possible decision model for a highly precise and highly up-to-date display of objects on a surroundings map is possible, such that actual real-time updating of a surroundings map virtually satisfies a real-time requirement not only with regard to speed but also with regard to the exactness of statements regarding important objects and/or the position thereof relative to the sensor or relative to the motor vehicle.

By way of the invention, allowance is thus made for the fact that a major improvement is realized in that, in the case of conventional embodiments of surroundings maps, incorrectly detected objects are no longer displayed, or an incorrect display occurs with much lower probability than in the prior art. On the other hand, the same applies to objects which, in the case of previous approaches, have not been displayed but should be displayed. The same then also applies to the position of objects to be displayed. By way of the invention, it is also achieved that commonly known phenomena in which objects are shown in a surroundings map with contour which is not sharp but is similar to a comet tail are avoided.

Further features of the invention will emerge from the claims, from the figures and from the description of the figures. The features and feature combinations mentioned above in the description, and the features and feature combinations mentioned below in the figure description and/or shown only in the figures may be used not only in the respectively specified combination but also in other combinations or individually, without departing from the scope of the invention. Thus, embodiments which are not explicitly shown and discussed in the figures but which emerge from and can be generated by separate feature combinations from the discussed embodiments are also to be regarded as being encompassed and disclosed by the invention.

Exemplary embodiments of the invention will be discussed in more detail below on the basis of schematic drawings, in which.

In the figures, identical or functionally identical elements are denoted by the same reference designations.

Figure 1:
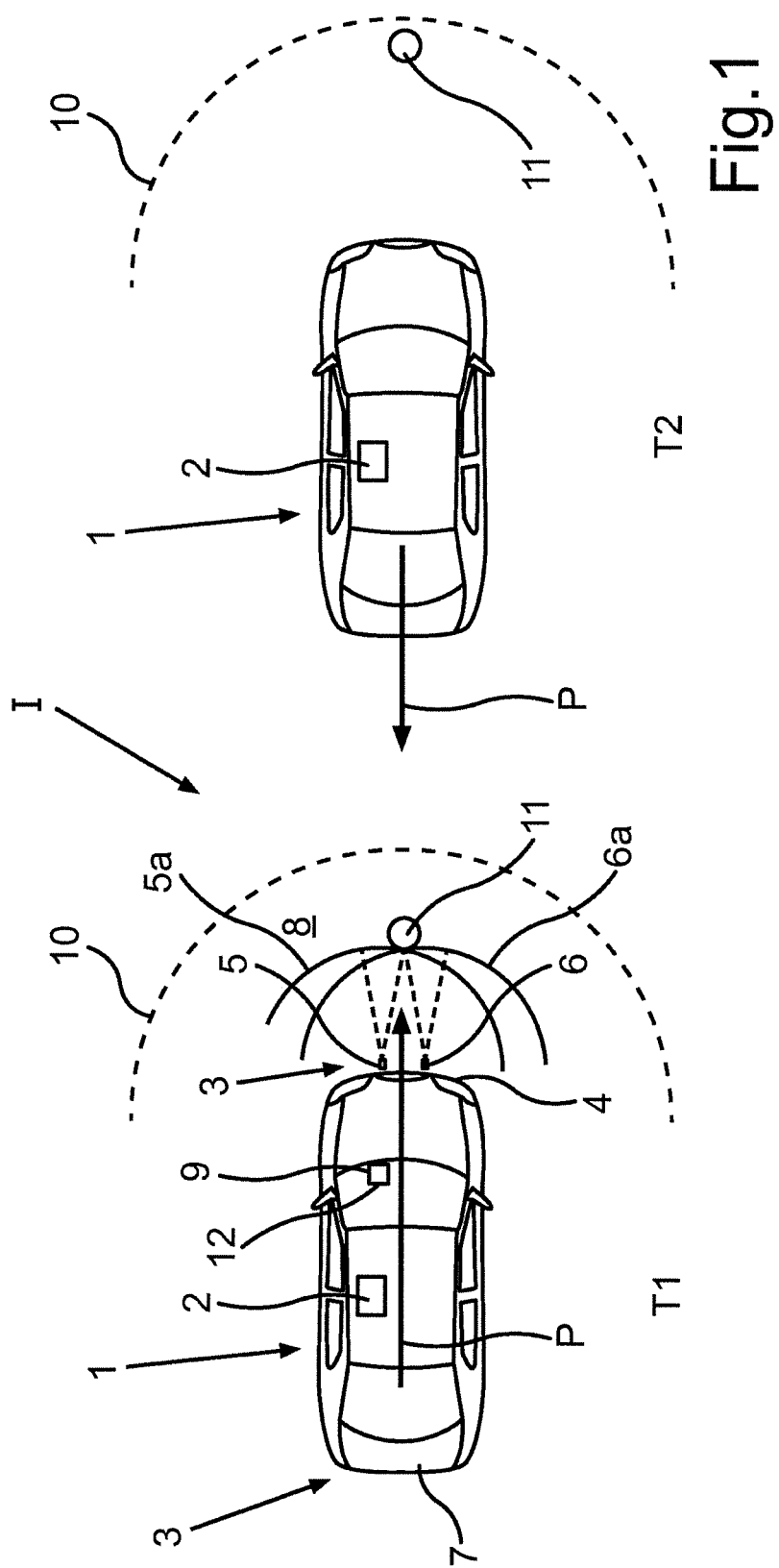
FIG. 1 shows a schematic plan view of a first exemplary embodiment of the traffic situation with different surroundings clearance situations.

FIG. 1 illustrates, in a plan view, a traffic situation I which is shown at two different points in time. On the left-hand side, the traffic situation I is illustrated at a point in time T1, whereas the traffic situation I, which extends over a certain period of time, is shown on the right-hand side at a point in time T2 which follows the point in time T1. Here, a motor vehicle 1 moves in the direction of an arrow P proceeding from the time T1. The motor vehicle 1 comprises a driver assistance system 2 which is at least one control unit and at least one evaluation unit. The motor vehicle 1 furthermore also comprises a sensor device, in particular an ultrasound sensor device 3, which has a multiplicity of sensors, in particular ultrasound sensors 5 and 6, at a front region 4 of the motor vehicle 1 and also a multiplicity of such ultrasound sensors at a rear region 7. The number of ultrasound sensors 5 and 6 is to be understood merely as an example and may also deviate from this, and in particular may have in each case at least three ultrasound sensors. In a surroundings area 8 of the motor vehicle 1 there may be arranged objects which can be detected by way of the ultrasound sensors 5 and 6. Here, at least one ultrasound sensor 5, 6, preferably both ultrasound sensors 5, 6, emit ultrasound signals 5a and 6a which are received again by the ultrasound sensors 5, 6 when said ultrasound signals have been reflected on an object in the surroundings area 8. The motor vehicle 1 furthermore comprises a display unit 9 which is preferably arranged in the motor vehicle 1, in particular in the region of a dashboard or of an instrument panel so as to be positionally fixed or removable in nondestructive fashion. The surroundings area 8 captured by the ultrasound sensors 5, 6 is displayed on said display unit 9. Here, said surroundings area 8 is shown to an extent which displayed by a capture area 10 which is defined by the ultrasound sensors 5, 6 and which constitutes the maximum detection range of the ultrasound sensors 5, 6. In the exemplary embodiment, it is provided that a static object 11 is arranged in the capture area 10 and is then detected during the movement of the motor vehicle 1 toward the object 11. This takes place at a certain reference distance in a manner dependent on the nature of the object 11. It may thus be provided that said object 11 is detected earlier, and thus at a greater reference distance, the greater and wider it is. By contrast, if the object 11 is relatively small and narrow, it is captured by the ultrasound sensors 5 and/or 6 only at a relatively small reference distance. The reference distance is thus individual and is dependent on the nature of the object and/or on the orientation of the sensors 5 and/or 6 relative to the object 11. In the example, the object 11 is actually present and is therefore not a merely supposed object which is not present and which would have been incorrectly detected.

The driver assistance system 2 is designed such that capturing of the surroundings area 8 by way of the at least one ultrasound sensor 5 and/or 6 is performed at at least two different points in time, for example the points in time T1 and T2. In a manner dependent on said surroundings clearance situations detected in each case in a manner dependent on the items of ultrasound sensor information at the points in time T1 and T2, a decision is made as regards whether an object, in the exemplary embodiment the object 11, is, upon an updating of the digital surroundings map 12 which is entirely or partially displayed on the display unit 9 and/or which in particular also can be displayed, as a surroundings map 12 derived from another map or other map data, on the display unit 9, displayed on the then updated surroundings map 12.

Here, the driver assistance system 2 is also configured such that a multiplicity of different confidence values is defined and predefined. Here, the confidence values characterize in particular also the probability of existence of the presence of an object and/or the position of an object during an object capture process of at least one ultrasound sensor 5, 6. The assignment of a specific confidence value to an object capture process is performed in a manner dependent on preferably at least one captured surroundings clearance situation and/or on at least one predefined reference clearance or a reference clearance situation and/or on a comparison of at least one surroundings clearance situation with a reference clearance and/or on the nature of an object.

Here, it is provided in particular that a multiplicity of different reference clearances is predefined, and at least in a manner dependent on a comparison of the surroundings clearance situations at the points in time T1 and T2 with at least one reference clearance and/or on a confidence value which characterizes a probability of existence of an object during an object capture process of the ultrasound sensor, a decision is made as to whether the object is rendered present or absent on the updated surroundings map. The surroundings map 12 is then also updated. In this context, a surroundings clearance situation is to be understood in particular to mean that at least a partial space of the surroundings area 8 is evaluated with regard to the local object situation, or is to be correspondingly understood, and consideration is thus given to whether one or more objects are present in said space, or how free from objects said space is. In this context, in FIG. 1, at the point in time T1, a surroundings clearance situation exists in which an object, specifically the object 11, is situated therein and is situated in a corresponding position, which relates in particular, if it is possible to detect this, to the distance and the orientation of the object 11 relative to the ultrasound sensors 5 and/or 6.

It is preferably the case that, in a manner dependent on the number of objects detected in the surroundings clearance situations and/or in a manner dependent on the nature of objects detected in the surroundings clearance situations and/or in a manner dependent on the spatial position of an object detected in at least one surroundings clearance situation relative to the motor vehicle 1 and/or in a manner dependent on a spatial change in position of an object detected in the surroundings clearance situations relative to the motor vehicle, a specific reference clearance is selected from the multiplicity of reference clearances for the comparison. For this purpose, it is preferably the case that, in a manner dependent on the number of objects detected in the surroundings clearance situations and/or in a manner dependent on the nature of objects detected in the surroundings clearance situations and/or in a manner dependent on the spatial position of an object detected in at least one surroundings clearance situation relative to the motor vehicle 1 and/or in a manner dependent on a spatial change in position of an object detected in the surroundings clearance situations relative to the motor vehicle 1, the number of reference clearances to be taken into consideration for the comparison is determined. In particular, it is provided that the driver assistance system 2 has a first reference clearance stored as object clearance, which is defined to the effect that, for the evaluation of an object, consideration is given in particular to a distance of the object to the ultrasound sensor 5 and/or 6 and the orientation of the object relative to the ultrasound sensor 5 and/or 6 and/or the frequency with which an object has been captured, wherein further or other criteria may also be taken into consideration.

In the embodiment in FIG. 1, it may furthermore be provided that the motor vehicle 1 approaches the object 11 even after the initial detection of the object 11, on the basis of which the abovementioned reference distance is also then characterized. At the point in time T2, which is illustrated by the right-hand image in FIG. 1, the motor vehicle 1 has then moved in the opposite direction in relation to the point in time T1, such that, up until the point in time T2, reverse travelling or driving has been performed. As can be seen at the point in time T2, the object 11 is then still situated within the capture area 10 of the ultrasound sensors 5 and/or 6, but is at a greater distance to the ultrasound sensors 5 and/or 6 than is predefined by the reference distance. In the exemplary embodiment, owing to the specific traffic situation I, the orientation of the motor vehicle 1 relative to the object has not changed, nor has the object 11 been predefined as a dynamic object. In this case, it is a static object 11. Owing to the configuration of the object 11, it is the case that, at the point in time T2, the object 11, despite still being in the capture area 10, is no longer captured by the ultrasound sensors 5 and/or 6.

For the comparison of the snapshots relating to the surroundings clearance situations at the points in time T1 and T2 with the first reference clearance, specifically the abovementioned object clearance, the reference distance value captured in the first surroundings clearance situation is stored. On the basis of the individual traffic situation I highlighted here, upon the relative change in position between the ultrasound sensor 5 and/or 6 and the object 11 that occurs in the second surroundings clearance situation at the point in time T2, it is checked whether the object 11 has been captured in the second surroundings clearance situation. As already mentioned above, this has, in the specific exemplary embodiment, been discussed by way of example as not being present. In the event that, in such a manner, the object 11 is no longer captured in the second surroundings clearance situation at the point in time T2, it is then provided here that the object 11 is no longer displayed on the updated surroundings map 12 on the basis of the criteria of the first reference clearance and in particular also of a specific confidence value, specifically the active confidence value. In particular, the object may however remain stored in particular in a preceding or alternative surroundings map.

In the specific traffic situation I, it is however possible—and this is preferably also correspondingly implemented—for a second reference clearance, which is defined as sensor clearance, to be taken into consideration in a further comparison with the surroundings clearance situations. The sensor clearance is defined such that, for the evaluation of an object, it is taken into consideration whether, in a surroundings clearance situation, said object is duly in the capture area of an ultrasound sensor but is not captured by the ultrasound sensor as an object. Such an example has already been discussed with regard to the point in time T2.

During the comparison of the surroundings clearance situations with the second reference clearance, namely the sensor clearance, an object is generally displayed on the surroundings map 12, which is to be updated, if an object has been captured by the ultrasound sensor 5 and/or 6 in the first surroundings clearance situation but, in the second surroundings clearance situation, the object has no longer been captured by the ultrasound sensor 5 and/or 6 but it can at least be assumed that the object remains in the capture area 10 of the ultrasound sensor 5 and/or 6. In particular, it is also the case here that further confidence values are utilized, which arise in particular from the already above-defined follow-up confidence value and deletion confidence value. As per the exemplary embodiment in FIG. 1, a situation is then identified in which the follow-up confidence value is taken into consideration. If the traffic situation I at the points in time T1 and T2 were evaluated only on the basis of the object clearance, the object 11 would no longer be displayed on the updated surroundings map 12, because it will no longer be detected at the point in time T2, in particular on the basis of the criteria of distance and orientation relative to the motor vehicle 1. Owing to the sensor clearance and/or the follow-up confidence value additionally being taken into consideration, it is however the case, by way of the then additional comparisons with the surroundings clearance situations at the points in time T1 and T2, that, with a model-based probability and/or a preferred priority list, reference clearances and/or confidence values of the decision check, a situation is identified in which, at the point in time T2, the object 11 can still be assumed, with a correspondingly high probability, to be in the capture area 10 but can no longer be detected by the ultrasound sensor 5 and/or 6 on the basis of the parameters already mentioned above. Such a situation will then, on the basis of the comparisons, the reference clearances used specifically for the comparisons, the specifically given surroundings clearance situations and the specific confidence values, decide that the object 11 should nevertheless be displayed on the updated surroundings map 12 because, with a model-based assumed probability, it can still be assumed that the object 11 is situated in the capture area 10.

Figure 2:
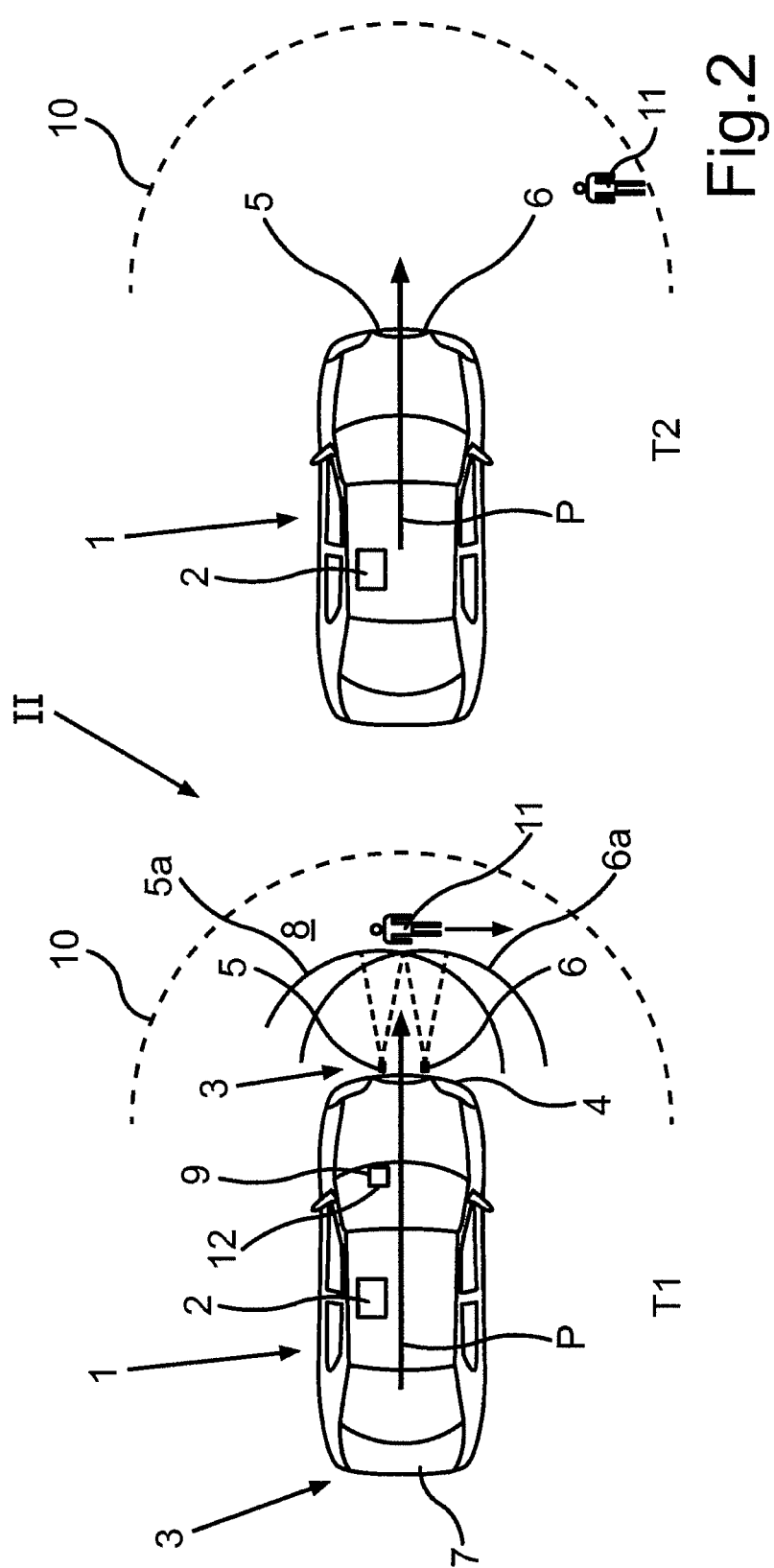
FIG. 2 shows a plan view of a further exemplary embodiment of a traffic situation with two different surroundings clearance situations.

FIG. 2 shows a further traffic situation II, in which, in turn, two surroundings clearance situations are characterized at the points in time T1 (left-hand image in FIG. 2) and at the point in time T2 (right-hand image in FIG. 2). In this refinement, by contrast to the illustration in FIG. 1, it is provided that an object is not static but rather an object 11 is moving relative to the motor vehicle 1, and may for example be a pedestrian or a cyclist or the like. Furthermore, it is provided here that the object 11 is moving not parallel to the direction of movement as per the arrow P but at a certain angle with respect thereto, in particular crosses the travel path of the motor vehicle 1 relatively perpendicular to the direction of movement of the vehicle.

The driver assistance system 2 also has a third reference clearance defined and stored as active clearance, wherein said active clearance can be considered in the sense that the space between an ultrasound sensor 5 and/or 6 and an object captured by the ultrasound sensor 5 and/or 6 is considered to be free from objects which are of similar height to the captured object, in particular free from objects greater than a defined height threshold value. During the comparison of the surroundings clearance situations with the third reference clearance, an object which is supposedly captured between the ultrasound sensor 5 and/or 6 and the captured object in at least one surroundings clearance situation and which is in particular of a height similar to the captured object is not displayed on the updated map, in particular on the basis of a specific confidence value.

In the traffic situation II in FIG. 2, it is the case in particular at the point in time T2, on the basis of the comparison of the surroundings clearance situations at the points in time T1 and T2 with the object clearance, that a situation exists in which, owing to the change in position between the motor vehicle 1 and the object 11 at the point in time T2 in relation to the point in time T1, in particular owing to the change in the orientation, the object 11 can no longer be identified at the point in time T2. On the basis of this comparative evaluation, in the light of the object clearance, the object 11 would no longer be displayed on the updated surroundings map 12. However, on the basis of the preferably further comparison with the sensor clearance, a situation is identified in which, on the basis of the confidence value, which is specifically assigned, in particular the deletion confidence value, it cannot be ruled out that the non-detected object 11 could nevertheless be within the capture area 10 at the point in time T2, but the probability that said object is outside the capture area 10 is graded as being higher. In this situation, it may be provided, in a manner dependent on further criteria, that the object 11 is then nevertheless displayed on the updated map 12.

In the two above-discussed exemplary embodiments as per FIG. 1 and FIG. 2, it is also preferably possible for the further consideration of the active clearance to be implemented and for a corresponding comparison with the surroundings clearance situations at the points in time T1 and T2 to be performed. In this way, it is also possible for decisions to be made regarding captured or else non-captured objects in a space between an ultrasound sensor 5 and/or 6 and the object 11, in particular if said objects are shorter than a height threshold value. In this way, incorrectly displayed objects in the active clearance or incorrectly non-displayed objects can be corrected, and/or an evaluation can be performed as regards a probability with which these are present or not present and with what probability they should then preferably be displayed or not displayed.

It is correspondingly also possible in particular for the background clearance to be taken into consideration, and for a comparison with the surroundings clearance situations to be performed.

Figure 3:
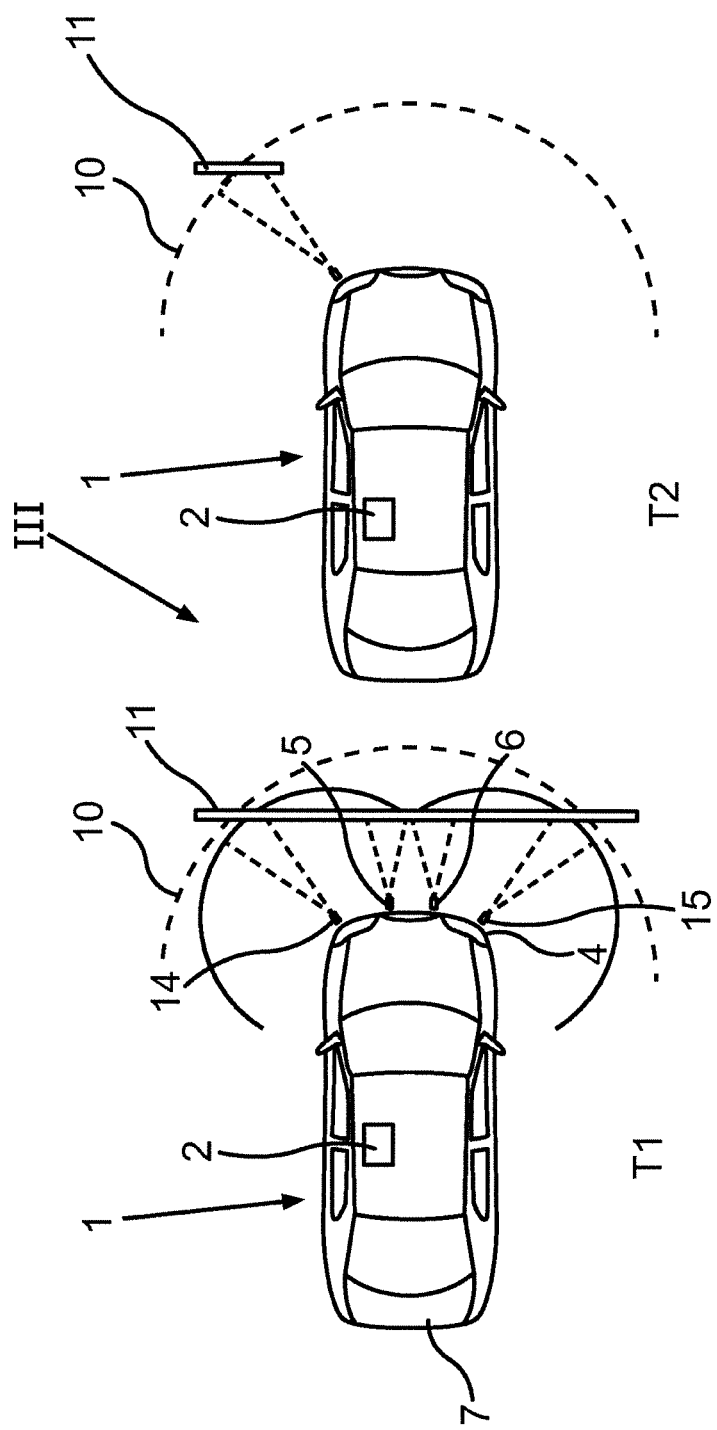
FIG. 3 shows a plan view of a third exemplary embodiment of a traffic situation with two surroundings clearance situations.

FIG. 3 shows, in a further illustration, an exemplary embodiment of a further different traffic situation III in relation to the different points in time T1 and T2, which constitute surroundings clearance situations. In this embodiment, by contrast to FIG. 1 and FIG. 2, the motor vehicle 1 is not moving, and is thus at a standstill, both at the time T1 and at the time T2, and it is also the case that the vehicle 1 has not been moved further in the time period between the points in time T1 and T2. Shown in front of the motor vehicle 1 in the surroundings area 8 is an object 11 which is for example a garage door which moves dynamically and thus relative to the motor vehicle 1 which is at a standstill. As can be seen here, at the time T1, the object 11 in the form of the garage door is virtually still closed, wherein, at the time T2, it has already opened at least over a relatively large width. The exemplary embodiment in FIG. 3 thus characterizes an embodiment in which it is also possible by way of the ultrasound sensors 5 and/or 6 to distinguish between a dynamic and a static object 11 on the basis of information from the motor vehicle, in particular when the motor vehicle 1 is at a standstill, which object can thus be characterized in FIG. 3 as a dynamic object.

Owing to these identified dynamics and a movement of the object 11, as it were, away from the motor vehicle 1, it is the case in this embodiment that the object 11 is no longer displayed on the updated surroundings map 12.

Figure 4:
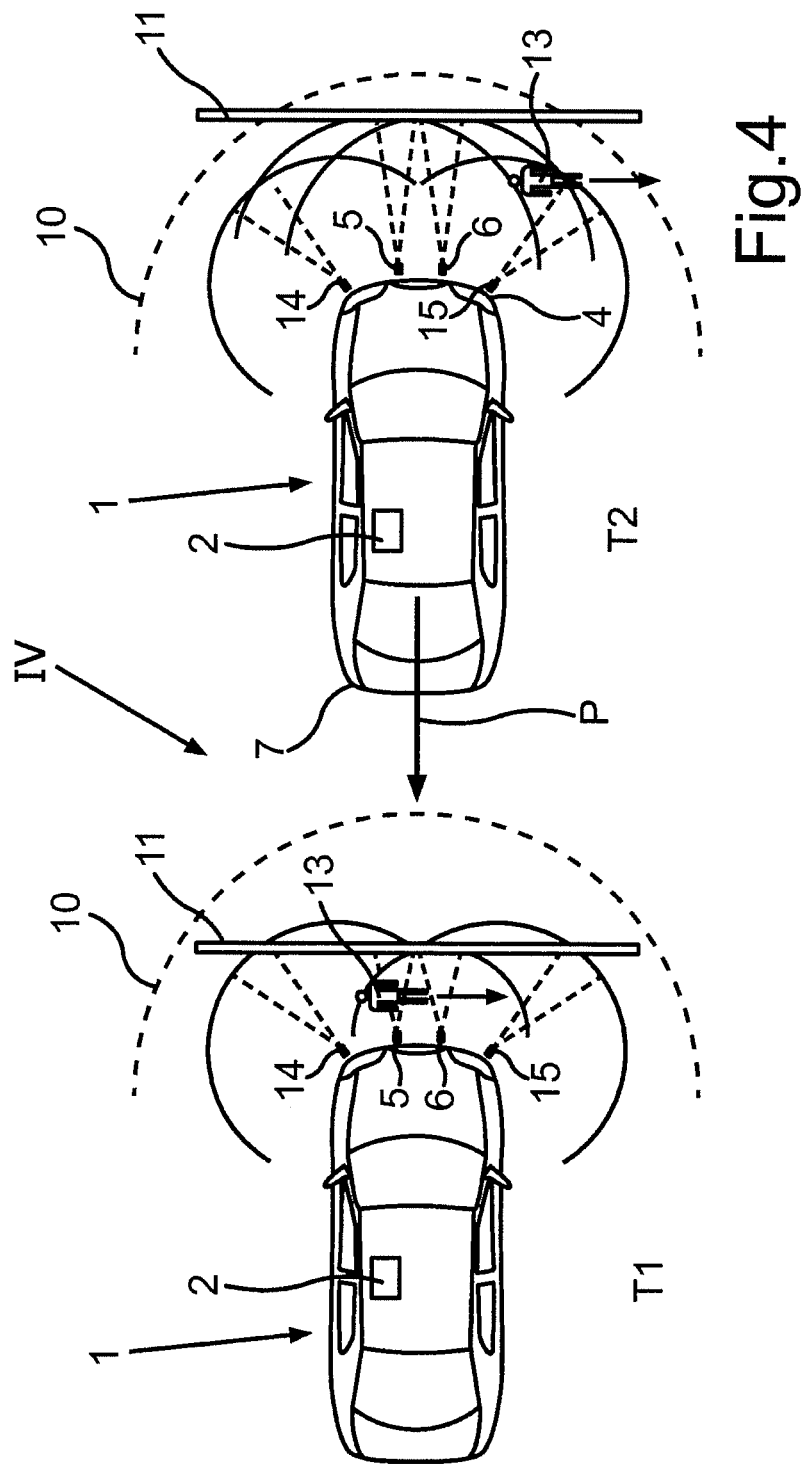
FIG. 4 shows a plan view of a fourth exemplary embodiment of a traffic situation with two surroundings clearance situations.

FIG. 4 shows, in a plan view, a further exemplary embodiment in which a traffic situation IV is shown in two snapshots on the basis of the respectively present conditions at the points in time T1 and T2 as surroundings clearance situations. In the plan view that is shown here, too, the object 11 is a static and thus positionally fixed object, for example a wall, in particular a relatively tall wall. In particular, at the point in time T1, the motor vehicle 1 is likewise at a standstill, and a further object 13 is present between the motor vehicle 1, in particular between the front-side ultrasound sensors 5 and/or 6, and the object 11, which further object, in the exemplary embodiment shown, moves relative to the object 11 and relative to the motor vehicle 1, in particular moves substantially transversely with respect to the vehicle longitudinal axis, in the time interval between T1 and T2. Both in the exemplary embodiment in FIG. 3 and in the exemplary embodiment in FIG. 4, further ultrasound sensors 14 and 15 are arranged in at least the front region of the motor vehicle 1. At the point in time T2, the motor vehicle 1 has moved away from the object 11 in the direction of the arrow P relative to the point in time T1, and thus a change in relative position between the object 11 and the motor vehicle 1 has occurred. This has correspondingly also occurred between the motor vehicle 1 and the further object 13, which is for example in the form of a pedestrian or cyclist. With regard to the evaluation as regards whether or not the object 11 should be included on the updated surroundings map 12 and whether or not said object should also then be displayed, reference may be made to the example in FIG. 1. With regard to the object 13, it is the case here in particular that the active clearance is also used, as reference clearance, for the comparison with the surroundings clearance situations. On the basis of this comparison, in particular on the basis of a specific confidence value which is to be taken into consideration, the object 13 would no longer be displayed on the updated surroundings map 12 if, at the point in time T2, it is assumed to no longer be in the capture area 10 or, in this regard, is explicitly identified as no longer being in the capture area 10. This is performed even though the conditions of the object clearance are evaluated as not being satisfied, because the motor vehicle 1 is moving away from the object 13.

In particular in the exemplary embodiments as per FIGS. 1 and 2, the active clearance is defined as being measured from the ultrasound sensors 5 and/or 6 to the object 11. That boundary or edge of said active clearance which is averted from the ultrasound sensors 5 and/or 6 is preferably defined by the orientation of the object 11, and thus said averted boundary of the active clearance extends parallel to or in the same direction as the orientation of the object 11. The space that then extends from said averted boundary of the active clearance to the end of the capture area 10 or the maximum limitation thereof is then the background clearance already discussed above. Said background clearance may then also be taken into consideration in particular in the exemplary embodiments as per FIG. 1 and FIG. 2, and a comparison with the surroundings clearance situations may be performed with regard to whether, in said background clearance, an object has been incorrectly captured or incorrectly not captured. It is then also possible for this evaluation to be taken into consideration in the updated surroundings map 12, and then for objects in said background clearance also to be displayed, or specifically then not displayed, on the updated surroundings map 12 in a manner dependent on the decision check.

It is preferably the case that, in the decision check, in a situation-dependent manner, in each case a maximum number of possible reference clearances is taken into consideration for the comparisons, such that maximum accuracy of the evaluation of the real situation with regard to objects which are present and which should be displayed is achieved. It is thus preferable if, in the examples in FIGS. 1 and 2, all four reference clearances are taken into consideration, because all thus characterized partial spaces of the capture area are accessible owing to the actual traffic situation I and II. In the examples in FIGS. 3 and 4, this does not apply. Owing to the tall static wall in the example as per FIG. 4, the background clearance is in this case irrelevant and should not be taken into consideration for the comparison.

In all of the exemplary embodiments, it is also possible, at at least one further point in time which follows the point in time T2, for surroundings clearance situations to be detected and then, on the basis of at least three surroundings clearance situations, in particular in a manner dependent on a comparison with reference clearances and/or confidence values, for a decision to be made as regards whether an object should be included in an updated surroundings map, and should in particular also be displayed in the case of an at least partial display of the updated surroundings map on a display unit.

Finally, it is also explicitly mentioned that the exemplary embodiments discussed represent merely a small number of possible traffic situations. By way of the exemplary embodiments, however, at least in each case one explicit illustration is shown for explaining, by way of example, the discussed reference clearances, in particular with associated or assigned confidence values. Here, it is in particular also mentioned that a virtually arbitrary number of individual traffic situations exists which can be represented by way of a moving motor vehicle and one or more moving objects at different distances from and with different directions of movement relative to the motor vehicle and/or one or more static objects with different orientations relative to and/or at different distances to the motor vehicle. This is correspondingly also possible for a motor vehicle which is at a standstill at the at least two points in time, and which also does not move in the interim in said time interval between the points in time, along with one or more dynamic objects, which objects may, in terms of position and/or direction of movement and/or speed, behave differently relative to the motor vehicle 1 and/or have one or more static objects which may exhibit different orientation relative to and distance from the motor vehicle. In all of these exemplary embodiments which form numerous variants, it is then possible, as already discussed generally above, for the number of reference clearances to be taken into consideration for comparison, and/or the sequence of the reference clearances to be taken into consideration for the evaluation and the comparison, to be implemented in a manner dependent on the situation. The same also applies to the confidence values. It is pointed out once again here that, in the context of the general disclosures and discussions above, these also specific numerous design variants are regarded as being presented and disclosed and the exemplary embodiments picked out by way of example on the basis of FIG. 1 to FIG. 4 are likewise considered to be discussed. Since, specifically with regard to the abovementioned different, widely varied individual traffic situations, it is however also possible, taking into consideration then the nature of the objects, for highly specific individual examples to be formed, it is the intention here, for the sake of a manageable illustration, to discuss only the influential factors for forming such variants, as has been done above.

It should be understood that, even though the exemplary embodiments comprise an ultrasound sensor, the sensor may generally be any suitable surroundings capture sensor on the motor vehicle, or it is possible for a combination of multiple surroundings capture sensors to be used. For example, the sensor may also be a radar sensor, a camera or a laser scanner. In particular, a combination of ultrasound sensor, radar sensor, camera and/or laser scanner may be used.

The invention claimed is:

1. A method for generating a surroundings map of a surroundings area of a motor vehicle, comprising:
    capturing the surroundings area by way of at least one sensor on the motor vehicle, at at least two different points in time, and dependent on surroundings clearance situations detected in each case in a manner dependent on items of sensor information at the at least two different points in time; and
    deciding whether an object situated in the surroundings area in at least one surroundings clearance situation is, upon an updating of the surroundings map, included on the updated surroundings map,
    wherein deciding comprises obtaining a probability of existence of an object in the surroundings area during an object capture process of the sensor, and
    wherein the object capture process comprises an active confidence value, a follow-up confidence value, and a deletion confidence value.

2. The method according to claim 1, wherein the assignment of a specific confidence value to an object capture process is performed dependent on at least one captured surroundings clearance situation, on at least one predefined reference clearance, and on a comparison of at least one surroundings clearance situation with a reference clearance and on the nature of an object.

3. A method for generating a surroundings map of a surroundings area of a motor vehicle, comprising:
    capturing the surroundings area by way of at least one sensor on the motor vehicle, at at least two different points in time, and dependent on said surroundings clearance situations detected in each case in a manner dependent on items of sensor information at the at least two different points in time; and
    deciding whether an object situated in the surroundings area in at least one surroundings clearance situation is, upon an updating of the surroundings map, included on the updated surroundings map,
    wherein a multiplicity of different reference clearances is predefined, and at least dependent on a comparison of the surroundings clearance situations with at least one reference clearance and/or on a confidence value which characterizes a probability of existence of an object in a surroundings area during an object capture process of the sensor, the object is rendered present or absent in the updated surroundings map.

4. The method according to claim 3, wherein, dependent on the number of objects detected in the surroundings clearance situations and/or in a manner dependent on the nature of objects detected in the surroundings clearance situations and/or in a manner dependent on the spatial position of an object detected in at least one surroundings clearance situation relative to the motor vehicle and/or in a manner dependent on a spatial change in position of an object detected in the surroundings clearance situations relative to the motor vehicle, a specific reference clearance is selected from the multiplicity of reference clearances for the comparison.

5. The method according to claim 3, wherein the number of reference clearances to be taken into consideration for the comparison is determined dependent on at least one of: the number of objects detected in the surroundings clearance situations and/or the nature of objects detected in the surroundings clearance situations and/or the spatial position of an object detected in at least one surroundings clearance situation relative to the motor vehicle and/or a spatial change in position of an object detected in the surroundings clearance situations relative to the motor vehicle.

6. The method according to claim 3, wherein a first reference clearance is defined as an object clearance in the case of which, for the evaluation of an object, a spacing of the object to the sensor and the orientation of the object relative to the sensor are taken into consideration.

7. The method according to claim 6, wherein, for the comparison of the surroundings clearance situations with the first reference clearance in the first surroundings clearance situation, a captured distance value in the presence of a specific orientation of the object at which the object was first detected is stored as a reference distance value, and at least in the event of a change in relative position between the sensor and the object occurring in the second surroundings clearance situation, it is checked whether the object has been captured in the second surroundings clearance situation, wherein, in the event of the object no longer being captured by the sensor in the second surroundings clearance situation, the object is no longer displayed on the updated surroundings map on the basis of the criteria of the first reference clearance and of a specific confidence value.

8. The method according to claim 3, wherein a second reference clearance is defined as a sensor clearance in the case of which, for the evaluation of an object a determination is made whether, in a surroundings clearance situation, said object is duly in the capture area of the sensor but is not captured by the sensor as an object.

9. The method according to claim 8, wherein during the comparison of the surroundings clearance situations with the second reference clearance, an object is displayed on the updated surroundings map on the basis of a specific confidence value, if an object has been captured by the sensor in the first surroundings clearance situation but, in the second surroundings clearance situation, the object has no longer been captured by the sensor but an assumption is made that the object remains in the capture area of the sensor.

10. The method according to claim 3, wherein a third reference clearance is defined as an active clearance in the case of which the space between the sensor and an object detected by the sensor is regarded as being free from objects greater than a height threshold value.

11. The method according to claim 10, wherein during the comparison of the surroundings clearance situations with the third reference clearance, an object which is supposedly captured between the sensor and the captured object in at least one surroundings clearance situation and which is in particular of a height similar to the captured object is not displayed on the updated surroundings map on the basis of a specific confidence value.

12. The method according to claim 10, wherein a fourth reference clearance is defined as a background clearance in the case of which an object is considered which is in a space of the capture area of the sensor extending, on the side averted from the sensor, so as to adjoin the active clearance and/or sensor clearance.

13. The method according to claim 12, wherein, during the comparison of the surroundings clearance situations with the fourth reference clearance, dependent on a confidence value of an object captured in the background clearance at least in one surroundings clearance situation, a determination is made whether the object is displayed on the updated surroundings map.

14. The method according to claim 3, wherein in the case of a comparison in which at least two different reference clearances are taken into consideration and, on the basis of a comparison with a reference clearance, the object is to be displayed on the updated surroundings map and, on the basis of a comparison with a different reference clearance, the object is not displayed on the updated surroundings map, a further decision check is performed.

15. The method according to claim 13, wherein the decision check is performed such that a display on the updated surroundings map is implemented if, at least in the case of a comparison with a reference clearance, a display is to be implemented, or the reference clearances are weighted and, dependent on the weighting, a determination is made whether a display on the updated surroundings map is implemented, or, on the basis of the changes to the surroundings clearance situations obtained as a result of the temporal sequence of the two surroundings clearance situations, a determination is made whether a display on the updated surroundings map is implemented.

16. The method according to claim 1, wherein the surroundings area is captured by way of at least one ultrasound sensor on the motor vehicle.

17. The method according to claim 1, wherein the method is executed by a driver assistance system which comprises at least one sensor and an evaluation unit.

18. The method according to claim 17, wherein the driver assistance system is installed in a motor vehicle and assists a driver of the motor vehicle.

19. The method according to claim 3, wherein the surroundings area is captured by way of at least one ultrasound sensor on the motor vehicle.

20. The method according to claim 3, wherein the method is executed by a driver assistance system which comprises at least one sensor and an evaluation unit.

* * * * *